US005794906A

United States Patent [19]

Harris et al.

[11] Patent Number: 5,794,906

[45] Date of Patent: Aug. 18, 1998

[54] SIGN SUPPORT SYSTEM

[76] Inventors: David Harris, 225 Southview Dr., Delran, N.J. 08075; Ken Resavy, 853 Orchard Ave., Runnemede, N.J. 08078

[21] Appl. No.: 672,971

[22] Filed: Jul. 1, 1996

[51] Int. Cl.[6] .............................. A47G 1/00; F16M 13/00

[52] U.S. Cl. .......................... 248/317; 248/489; 248/544; 40/600

[58] Field of Search .............................. 24/317, 544, 466, 24/468, 489, 222, 346.03; 40/600

[56] References Cited

U.S. PATENT DOCUMENTS

| | | | |
|---|---|---|---|
| 2,094,107 | 9/1937 | Post | 248/317 |
| 3,953,065 | 4/1976 | Shannon, Jr. | |
| 4,458,873 | 7/1984 | Sutherland | 248/544 |
| 4,508,467 | 4/1985 | Choffin | |
| 4,523,357 | 6/1985 | Widditsch | 248/544 |
| 5,188,332 | 2/1993 | Callas | 40/600 |
| 5,499,789 | 3/1996 | Rose | 248/489 |

*Primary Examiner*—Victor N. Sakran

[57] ABSTRACT

A new Sign Support System for offering a device that is effective and efficient in the hanging of a sign and causes the action to become safer. The inventive device includes a hanger clamp assembly, a stabilizer bar assembly, and a telescopic applicator assembly and "J" hooks. In use, a sign 2 is affixed to the hanger clamp assembly 20 at an upper end of the sign. The stabilizer bar assembly 30 is fastened to the bottom of the sign 2 and serves as a weight which holds the sign taught and causes the sign 2 to resist movement ordinarily caused by air draft or slight wind. The sign support system 10 is then lifted up by use of the telescopic applicator assembly 40 and hooked on "J" hooks or wire, or the like.

4 Claims, 4 Drawing Sheets

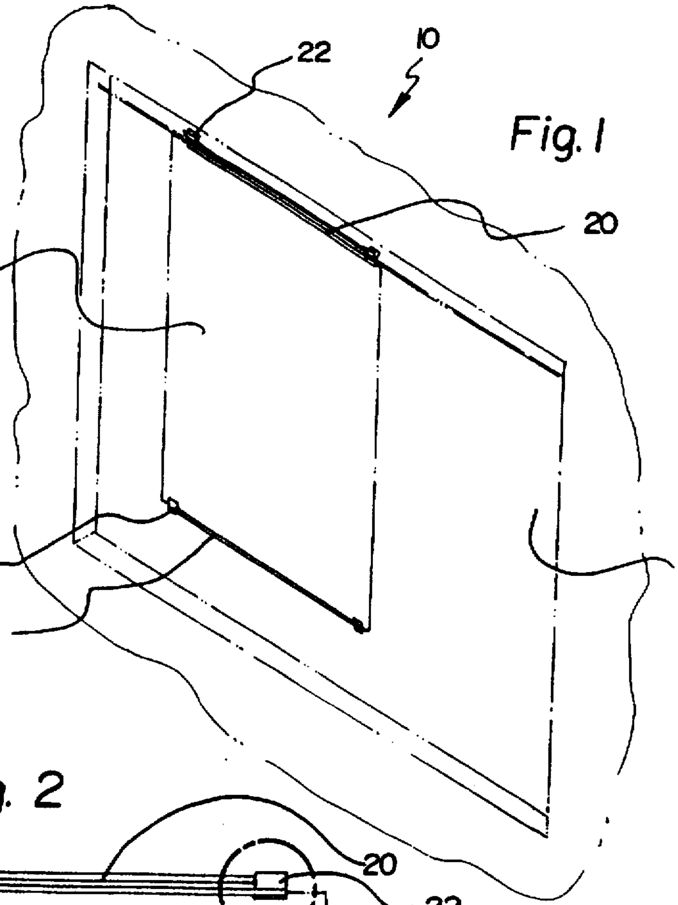
Fig. 1
Fig. 2
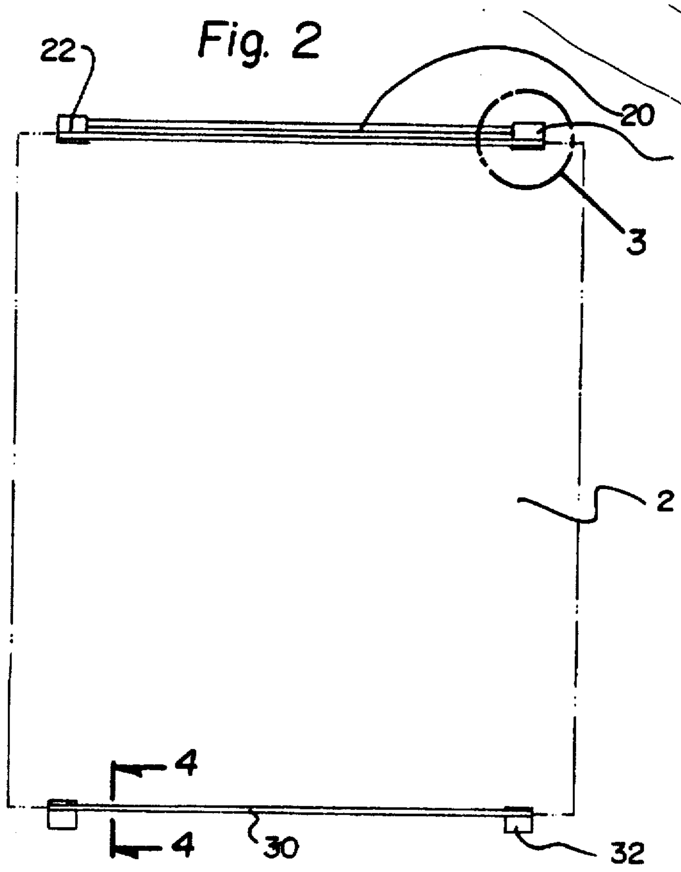

20
27
23
21
28
22
29
26
25
24

2
30

5
36
39
32
38
34
37

Fig. 7
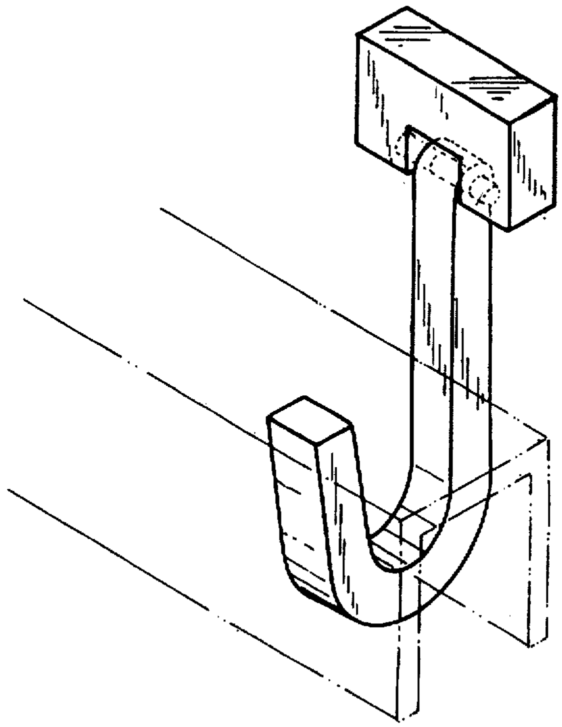
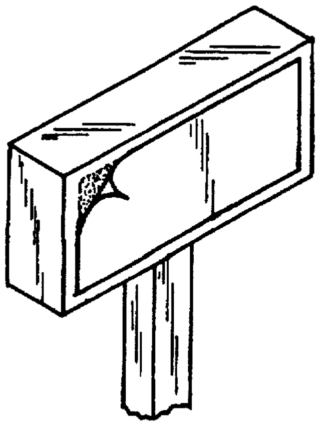
Fig. 8

SIGN SUPPORT SYSTEM

BACKGROUND OF THE INVENTION

1. Field of the Invention

The present invention relates to sign supports and more particularly pertains to a new Sign Support System for offering a device that is effective and efficient in the hanging of a sign and causes the action to become safer.

2. Description of the Prior Art

The use of sign supports is known in the prior art. More specifically, sign supports heretofore devised and utilized are known to consist basically of familiar, expected and obvious structural configurations, notwithstanding the myriad of designs encompassed by the crowded prior art which have been developed for the fulfillment of countless objectives and requirements.

Known prior art sign supports include U.S. Pat. No. 4,703,575; U.S. Pat. No. 5,188,332; U.S. Pat. No. Des. 342,198; U.S. Pat. No. 4,508,467; U.S. Pat. No. 3,953,065, and U.S. Pat. No. 5,381,991.

While these devices fulfill their respective, particular objectives and requirements, the aforementioned patents do not disclose a new Sign Support System. The inventive device includes a hanger clamp assembly, a stabilizer bar assembly, and a telescopic applicator assembly and "J" hooks.

In these respects, the Sign Support System according to the present invention substantially departs from the conventional concepts and designs of the prior art, and in so doing provides an apparatus primarily developed for the purpose of offering a device that is effective and efficient in the hanging of a sign and causes the action to become safer.

SUMMARY OF THE INVENTION

In view of the foregoing disadvantages inherent in the known types of sign supports now present in the prior art, the present invention provides a new Sign Support System construction wherein the same can be utilized for offering a device that is effective and efficient in the hanging of a sign and causes the action to become safer.

The general purpose of the present invention, which will be described subsequently in greater detail, is to provide a new Sign Support System apparatus and method which has many of the advantages of the sign supports mentioned heretofore and many novel features that result in a new Sign Support System which is not anticipated, rendered obvious, suggested, or even implied by any of the prior art sign supports, either alone or in any combination thereof.

To attain this, the present invention generally comprises a hanger clamp assembly, a stabilizer bar assembly, and a telescopic applicator assembly and "J" hooks.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Sign Support System apparatus and method which has many of the advantages of the sign supports mentioned heretofore and many novel features that result in a new Sign Support System which is not anticipated, rendered obvious, suggested, or even implied by any of the prior art sign supports, either alone or in any combination thereof.

It is another object of the present invention to provide a new Sign Support System which may be easily and efficiently manufactured and marketed.

It is a further object of the present invention to provide a new Sign Support System which is of a durable and reliable construction.

An even further object of the present invention is to provide a new Sign Support System which is susceptible of a low cost of manufacture with regard to both materials and labor, and which accordingly is then susceptible of low prices of sale to the consuming public, thereby making such Sign Support System economically available to the buying public.

Still yet another object of the present invention is to provide a new Sign Support System which provides in the apparatuses and methods of the prior art some of the advantages thereof, while simultaneously overcoming some of the disadvantages normally associated therewith.

Still another object of the present invention is to provide a new Sign Support System for offering a device that is effective and efficient in the hanging of a sign and causes the action to become safer.

Yet another object of the present invention is to provide a new Sign Support System which includes a hanger clamp assembly, a stabilizer bar assembly, and a telescopic applicator assembly and "J" hooks.

Still yet another object of the present invention is to provide a new Sign Support System that eliminates the safety hazard of using a ladder to hang a sign in a super market or the like.

Even still another object of the present invention is to provide a new Sign Support System that eliminates awkward positioning of a person's body while hanging a sign.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a right side perspective view of a new Sign Support System holding a sign according to the present invention.

FIG. 2 is a front elevation view thereof.

FIG. 7 is a perspective view showing the J hook connection to the channel attachment means.

FIG. 8 is a rear perspective view of the adhesive backing of the J hook.

DESCRIPTION OF THE PREFERRED EMBODIMENT

Figure 3:
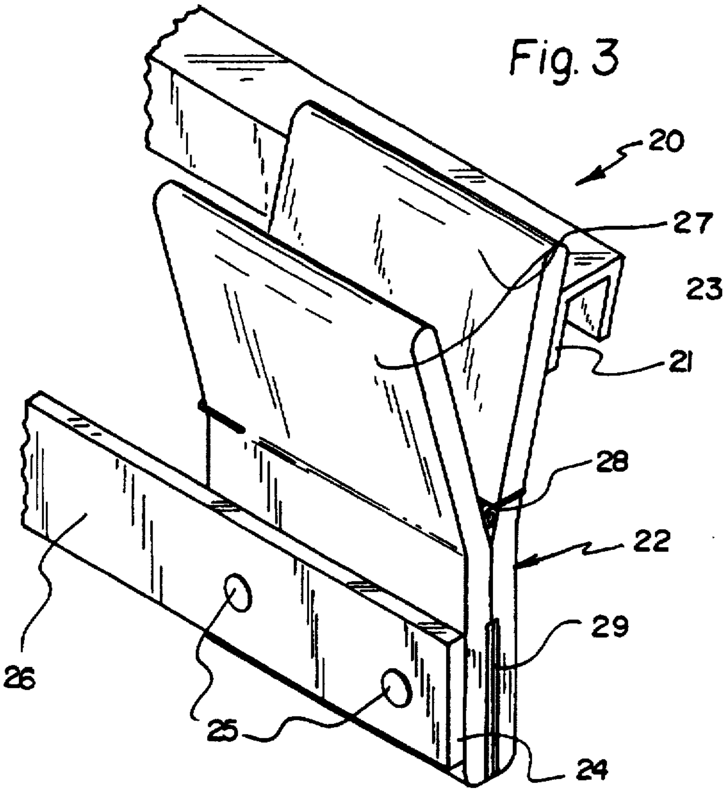
FIG. 3 is an enlarged detailed illustration of a hanger clamp of the present invention.
Figure 4:
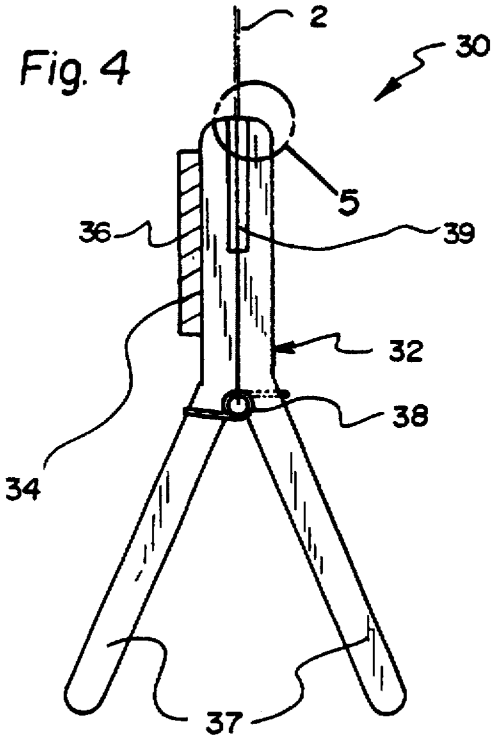
FIG. 4 is an enlarged detailed illustration of a stabilizer clip of the present invention.
Figure 6:
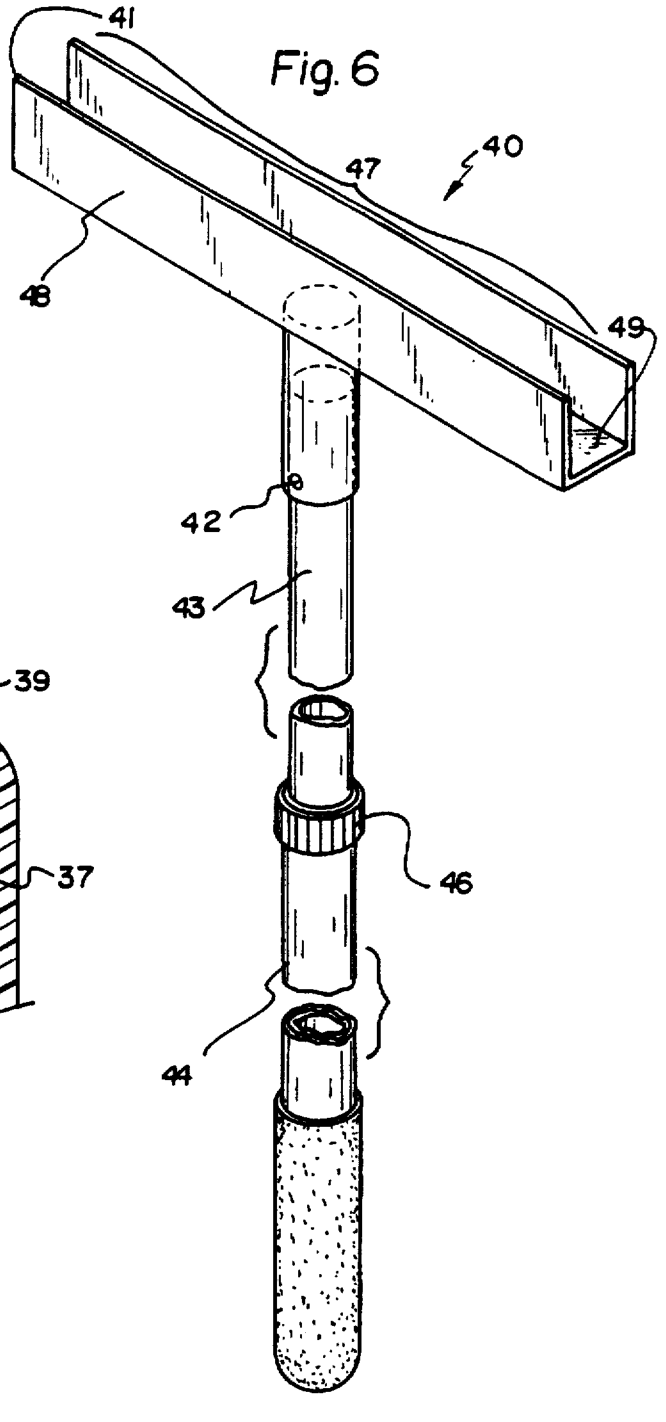
FIG. 6 is a right side perspective view a telescopic applicator assembly of new Sign Support System according to the present invention.
Figure 5:
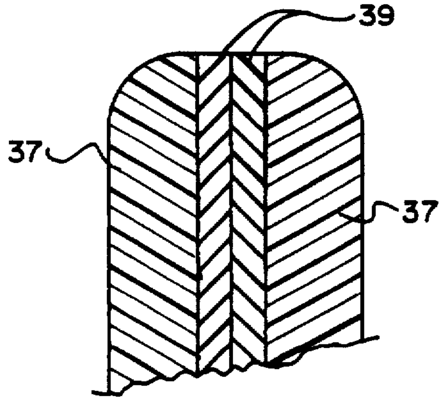
FIG. 5 is a cross sectional view of a stabilizer clip and a clip grip of the present invention.

With reference now to the drawings, and in particular to FIGS. 1 through 6 thereof, a new Sign Support System embodying the principles and concepts of the present invention and generally designated by the reference numeral 10 will be described.

More specifically, it will be noted that the Sign Support System 10 comprises a hanger clamp assembly 20, a stabilizer bar assembly 30, and a telescopic applicator assembly 40, where the hanger clamp assembly 20 fastens on to the top of a sign 2 and the stabilizer bar assembly 30 fastens on to the bottom of the sign 2 and the telescopic applicator assembly 40 is used to lift the sign 2 up into the air to hang on "J" hooks or support wire in a store window 4.

As best illustrated in FIGS. 1 through 6, it can be shown that the hanger clamp assembly 20 is further comprised of a support channel 23 and is attached to hanger clamps 22 by a channel attachment means 21. In addition to this, the hanger clamps 22 are also attached to a clamp bar 26 and are further comprised of clamp handles 27 which are spring biased held together by a clamp spring 28. Where the hanger clamps 22 further include clamp grips 29 for grabbing a sign 2.

The stabilizer bar assembly 30 comprises a clip bar 36 fastened to stabilizer clips 32 by clip attachment means 34. In addition to this, the stabilizer clips 32 are further comprised of clip handles 37 which are spring biased held together by a clip spring 38. Where the stabilizer clips 32 further include clip grips 39 for grabbing a sign 2.

The telescopic applicator assembly 40 further comprises a hanger support 41 which is further defined as an elongated U channel 47 having 2 upper vertical legs 48 and a lower horizontal leg 49 and a hanger attachment means 42 which fastens the hanger support 41 to an upper pole handle 43 at an upper end. The upper pole handle 43 is connected at a lower end to a lower pole handle 44 by a handle extension means 46.

In use, a sign 2 is affixed to the hanger clamp assembly 20 at an upper end of the sign. The stabilizer bar assembly 30 is fastened to the bottom of the sign 2 and serves as a weight which holds the sign taught and causes the sign 2 to resist movement ordinarily caused by air draft or slight wind. The sign support system 10 is then lifted up by use of the telescopic applicator assembly 40 and hooked on "J" hooks or wire, or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Sign Support System comprising:

a hanger clamp assembly attached to a number of hanger clamps by a channel attachment means for hanging the clamp assembly the hanger clamps further being attached to a clamp bar, the clamp assembly further having a number of spring biased clamp handles held together by a clamp spring, the hanger clamps further having clamp grips for grabbing a sign;

a stabilizer bar assembly;

a telescopic applicator assembly;

a number of hooks;

the hanger clamp assembly adapted for fastening to a top of a sign;

the stabilizer bar assembly adapted to fasten to a bottom of the sign;

and the telescopic applicator assembly adapted to lift the sign up into the air to hang on the hooks.

2. The Sign Support System of claim 1, wherein the stabilizer bar assembly comprises a clip bar fastened to stabilizer clips, the stabilizer clips having spring biased clip handles held together by a clip spring, the stabilizer clips further having clip grips for grabbing a sign.

3. The Sign Support System of claim 2, wherein the telescopic applicator assembly further comprises a hanger support which is further defined as an elongated channel having upper vertical legs and a lower horizontal leg, a hanger attachment means for attaching the hanger support to a pole at an upper pole end, the pole further having a handle at a lower pole end and an extension means for extending the length of the pole.

4. The Sign Support System of claim 3, wherein the hanger clamp assembly is located at an upper end of the sign and the stabilizer bar assembly is fastened to the bottom of the sign.

* * * * *